United States Patent
Jeon et al.

(10) Patent No.: US 8,264,609 B2
(45) Date of Patent: Sep. 11, 2012

(54) CAPTION PRESENTATION METHOD AND APPARATUS USING SAME

(75) Inventors: Sung-min Jeon, Suwon-si (KR); Cheul-hee Ham, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 12/929,253

(22) Filed: Jan. 11, 2011

(65) Prior Publication Data

US 2011/0106535 A1      May 5, 2011

Related U.S. Application Data

(63) Continuation of application No. 11/044,238, filed on Jan. 28, 2005, now Pat. No. 7,944,506.

(30) Foreign Application Priority Data

Feb. 3, 2004  (KR) ................................. 2004-6975

(51) Int. Cl.
*H04N 11/00* (2006.01)
*H04N 5/445* (2011.01)

(52) U.S. Cl. ......... 348/564; 348/468; 348/589; 348/600

(58) Field of Classification Search .......... 348/563–565, 348/569, 586, 588–589, 596, 600, 468, 552–553; 725/37, 39–40, 85, 49, 51–54, 131, 134, 725/139, 151, 141, 153; *H04N 11/00, 4/445*
See application file for complete search history.

(56) References Cited

U.S. PATENT DOCUMENTS

| | | | |
|---|---|---|---|
| 5,477,274 A | 12/1995 | Akiyoshi et al. | |
| 5,913,009 A | 6/1999 | Kuboji et al. | |
| 5,960,432 A | 9/1999 | Werner | |
| 5,995,160 A | 11/1999 | Rumreich | |
| 6,055,023 A | 4/2000 | Rumreich et al. | |
| 6,088,064 A | 7/2000 | Rumreich et al. | |
| 6,097,442 A | 8/2000 | Rumreich et al. | |
| 6,915,528 B1 | 7/2005 | McKenna | |
| 6,963,906 B2 | 11/2005 | Portuesi | |
| 6,977,667 B1 | 12/2005 | Burke | |
| 7,106,381 B2 | 9/2006 | Molaro et al. | |
| 2003/0028873 A1 | 2/2003 | Lemmons | |
| 2006/0262219 A1 | 11/2006 | Molaro et al. | |

FOREIGN PATENT DOCUMENTS

| | | |
|---|---|---|
| JP | 2000-244816 | 9/2000 |
| JP | 2002-010156 | 1/2002 |
| JP | 2002-290894 | 10/2002 |

(Continued)

OTHER PUBLICATIONS

U.S. Notice of Allowance dated Jan. 24, 2011, issued in the file history of U.S. Appl. No. 11/044,238.

(Continued)

*Primary Examiner* — Trang U Tran
(74) *Attorney, Agent, or Firm* — Staas & Halsey LLP (57) ABSTRACT

A caption presentation method and an apparatus using the method, by which caption and information related to the caption can be provided together in a broadcast receiver or in an image reproducer that displays the caption in a closed caption method. The method includes detecting subject information from a caption signal; obtaining visual information with respect to the caption, based on the detected caption subject information; and displaying the visual information and the caption signal together.

10 Claims, 5 Drawing Sheets

FOREIGN PATENT DOCUMENTS

| KR | 10-2001-0073973 | 8/2001 |
|----|-----------------|--------|
| KR | 2001-0107877 | 12/2001 |
| KR | 10-2003-0077348 | 10/2003 |

OTHER PUBLICATIONS

U.S. Appl. No. 11/044,238, filed Jan. 28, 2005, Sung-min Jeon et al., Samsung Electronics Co., Ltd.

Korean Office Action dated May 25, 2010, issued in corresponding Korean Patent Application No. 10-2004-0006975.

U.S. Office Action dated Mar. 20, 2008, issued in the file history of U.S. Appl. No. 11/044,238.

U.S. Office Action dated Jan. 6, 2009, issued in the file history of U.S. Appl. No. 11/044,238.

U.S. Final Office Action dated Jun. 26, 2009, issued in the file history of U.S. Appl. No. 11/044,238.

U.S. Advisory Action dated Sep. 2, 2009, issued in the file history of U.S. Appl. No. 11/044,238.

U.S. Office Action dated Nov. 27, 2009, issued in the file history of U.S. Appl. No. 11/044,238.

U.S. Interview Summary dated Mar. 11, 2010, issued in the file history of U.S. Appl. No. 11/044,238.

U.S. Final Office Action dated Jun. 8, 2010, issued in the file history of U.S. Appl. No. 11/044,238.

U.S. Office Action dated Oct. 5, 2010, issued in the file history of U.S. Appl. No. 11/044,238.

CAPTION PRESENTATION METHOD AND APPARATUS USING SAME

CROSS-REFERENCE TO RELATED APPLICATION

This application is a continuation of U.S. application Ser. No. 11/044,238, filed Jan. 28, 2005, now U.S. Pat. No. 7,944,506 which in turn claims the benefit of Korean Patent Application No. 2004-6975, filed on Feb. 3, 2004, in the Korean Intellectual Property Office, the disclosures of which are incorporated herein in their entirety by reference.

BACKGROUND

1. Field

The present invention relates to a caption presentation method and apparatus using the same in a broadcast receiver or in an image reproducer and, more particularly, to a method and an apparatus by which subject information related to a caption can be displayed with the caption in a broadcast receiver or an image reproducing apparatus that displays the caption according to a closed caption method.

2. Description of the Related Art

Caption presentation can be divided into two types: open captioning and closed captioning. Open captioning displays captions by including the captions in image data so that a user can always see the captions. In closed captioning, only when a user would like to see the captions, coded captions are decoded by a caption decoder, and the decoded captions are combined with the image data and displayed.

Figure 1A:
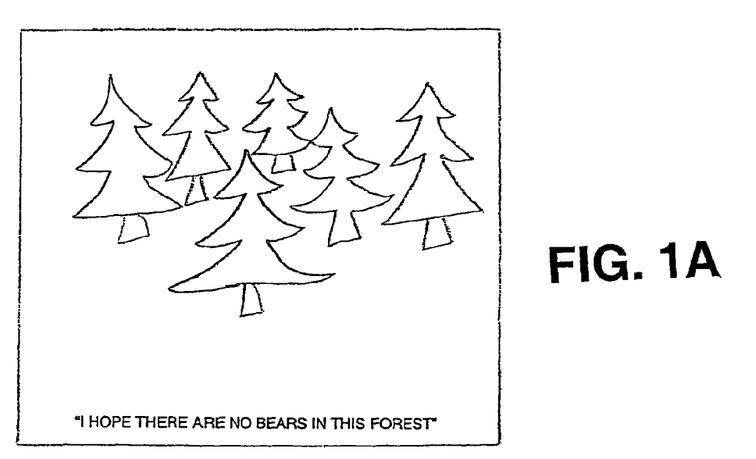
FIGS. 1A and 1B are exemplary views of caption presentations according to the related art.
Figure 1B:
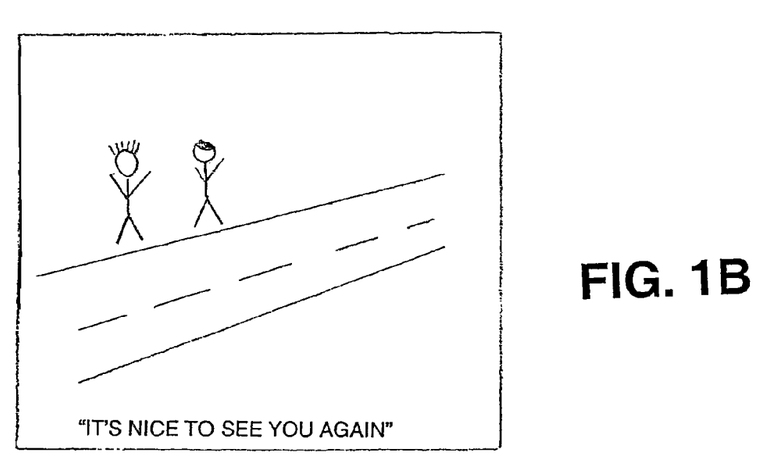

The caption presentation function is generally intended for a foreign language user or the hearing impaired and displays sound, generally speech text information corresponding to displayed images. However, the present caption presentation function does not provide information on the speaker of the caption (hereinafter referred to as or subject information). Thus, if a caption is presented with an image including one speaker, the user can recognize that speaker is the one doing the speaking. However, if the captions of various speakers are displayed and the image shows no speaker (FIG. 1A) or with the image includes several speakers (FIG. 1B) the user cannot tell who is talking.

SUMMARY

Accordingly, it is an aspect of the present invention to provide a caption presentation method and an apparatus by which information about the speaker of a caption can be displayed in a broadcast receiver or an image reproducer that displays the caption in a closed caption method.

Accordingly, it is another aspect of the present invention to provide a caption presentation method and an apparatus by which a caption can be provided with information about the speaker of the caption in a broadcast receiver or an image reproducer that displays the caption in a closed caption method.

Accordingly, it is another aspect of the present invention to provide a caption presentation method and an apparatus by which visual information regarding the speaker of a caption can be provided in a broadcast receiver or an image reproducer that displays the caption in a closed caption method.

Additional aspects and/or advantages of the invention will be set forth in part in the description which follows and, in part, will be obvious from the description, or may be learned by practice of the invention.

The foregoing and/or other aspects are achieved by providing a method of presenting a caption, including: detecting subject information from a caption signal; obtaining visual information with respect to the caption based on the detected subject information; and displaying the obtained visual information and the caption signal together.

The foregoing and/or other aspects are achieved by providing an apparatus to display a caption including: a decoder to decode a caption signal; a subject information detector to detect subject information of the caption from the caption signal; a visual information obtaining unit to obtain visual information corresponding to the caption, based on the detected subject information; a combining unit to combine the decoded caption signal and the visual information obtained from the visual information obtaining unit; and a display unit to display the combined caption signal and visual information.

BRIEF DESCRIPTION OF THE DRAWINGS

The above and/or other aspects and advantages of the invention will become more apparent by describing in detail exemplary embodiments thereof with reference to the attached drawings in which.

DETAILED DESCRIPTION OF THE PREFERRED EMBODIMENT

Reference will now be made in detail to the embodiment of the present invention, an example of which is illustrated in the accompanying drawings, wherein like reference numerals refer to the like elements throughout. The embodiment is described below to explain the present invention by referring to the figures.

Figure 2:
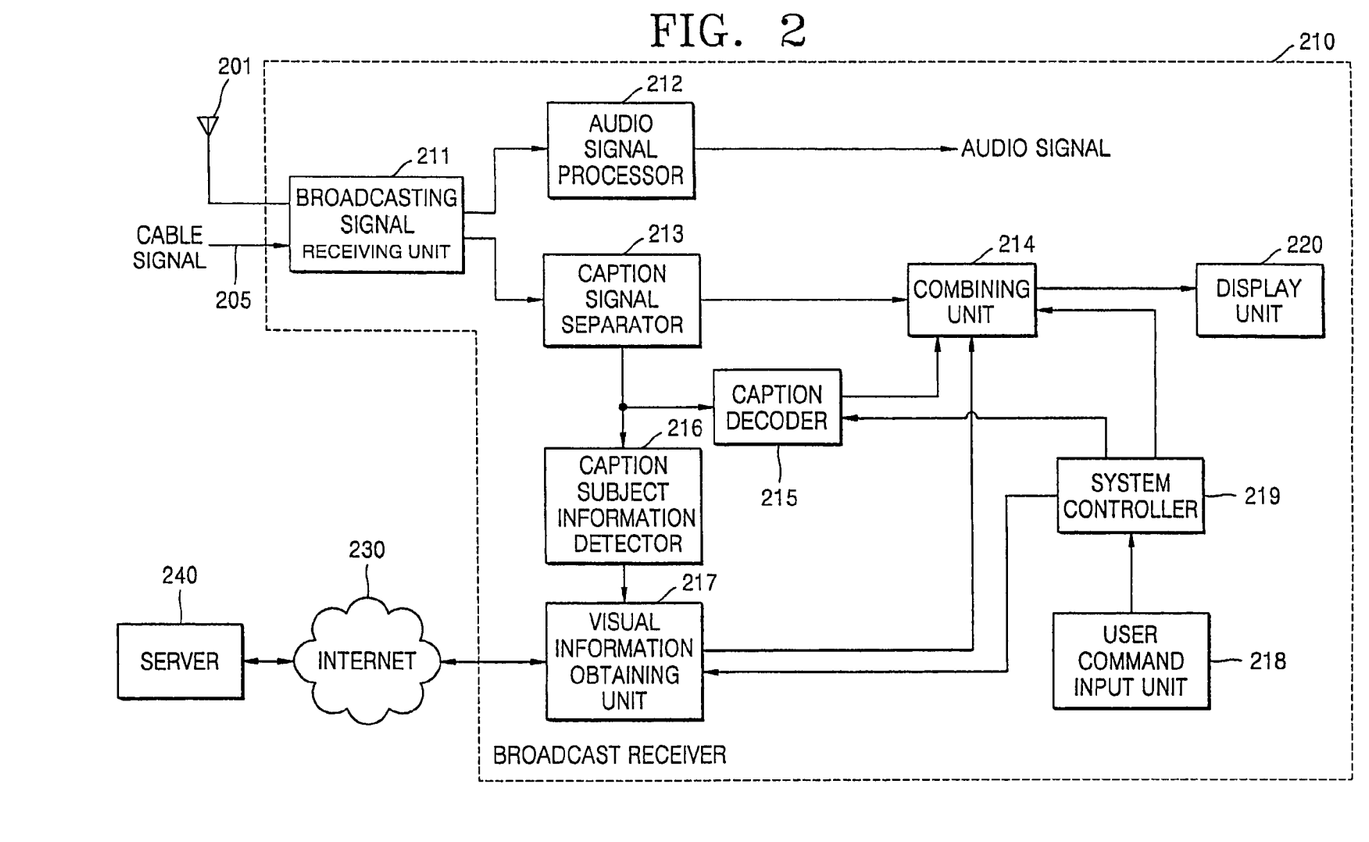
FIG. 2 is a block diagram of a broadcast receiver including a caption presentation apparatus according to an embodiment of the present invention and an example of a user of the broadcast receiver.

FIG. 2 is an example of a use of a broadcast receiver including a caption presentation apparatus according to an embodiment of the present invention. Referring to FIG. 2, a broadcast receiver 210 can receive a broadcast signal through an antenna 201 or receive a cable signal through a cable input 205. The broadcast receiver 210 can present captions in a closed caption method.

The broadcast receiver 210 includes a broadcast signal receiving unit 211, an audio signal processor 212, a caption signal separator 213, a combining unit 214, a caption decoder 215, a caption subject information detector 216, a visual information obtaining unit 217, a user command input unit 218, a system controller 219, and a display unit 220.

The broadcast signal receiving unit 211 receives the broadcast signal through the antenna 201, or receives the cable signal through the cable input 205. Although not shown in FIG. 2, the broadcast signal receiving unit 211 is controlled by the system controller 219 to perform the above functions.

When an audio signal is transmitted from the broadcast signal receiving unit 211, the audio signal processor 212 converts the audio signal into a form that can be heard by the user and outputs the converted signal.

The caption signal separator 213 separates the caption signal included in the image signal based on a caption signal separation reference that is set in advance, when the image signal is transmitted from the broadcast signal receiving unit 211. The caption signal is included in a predetermined position of the image signal according to a caption broadcasting standard. For example, according to a Korean captioning standard, the caption signal is inserted as a 2-byte unit in a 21st line of an even field on a vertical blanking internal (VBI) section in a composite video blanking signal. The caption signal separation reference is determined according to a caption broadcasting standard in the broadcasting environment where the broadcast receiver 210 is used.

The caption signal separator 213 transmits the image signal to the combining unit 214 and transmits the caption signal to the caption decoder 215 and the caption subject information detector 216.

The combining unit 214 combines the image signal output from the caption signal separator 213, the caption signal output from the caption decoder 215, and visual information output from the visual information obtaining unit 217.

The caption decoder 215 decodes the caption signal output from the caption signal separator 213 and outputs the decoded caption signal to the combining unit 214.

The caption subject information detector 216 detects the subject information of the caption included in the caption signal. The subject information of the caption is identification information about the speaker corresponding to the caption. The subject information of the caption can be represented as binary information. The position where the subject information is inserted in the caption signal can be determined in advance. Otherwise, the identification information representing the subject information of the caption is defined in advance, and the subject information can be inserted into a discretionary position of the section where the caption signal is inserted.

The caption subject information detector 216 detects the caption subject information from the caption signal based on the detecting reference that is set according to the insertion condition of the subject information of the caption.

The visual information obtaining unit 217 obtains the visual information based on the caption subject information transmitted from the caption subject information detector 216. As shown in FIG. 2, the visual information obtaining unit 217 obtains the visual information through an Internet searching method.

Thus, the visual information obtaining unit 217 connects to the Internet 230 and searches for the corresponding visual information by connecting a server 240 using the caption subject information.

That is, when the caption subject information is input, the visual information obtaining unit 217 tries to connect to the Internet 230. When the visual information obtaining unit 217 is connected to the Internet 230, the visual information obtaining unit 217 starts the Internet searching operation using the caption subject information. Accordingly, when the visual information obtaining unit 217 searches the visual information corresponding to the presently input caption subject information from among the visual information managed by the server 240, the searched visual information is determined to be the visual information corresponding to the presently input caption subject information.

The server 240 is a system operated by a service provider that provides the visual information corresponding to the caption subject information. One or more pieces of visual information can correspond to one piece of caption subject information. The visual information is a representative image showing the subject of the caption. For example, a stopped image of the caption subject or an avatar of the caption subject may be the visual information. The representative image may be a thumbnail image.

The visual information obtaining unit 217 outputs the obtained visual information to the combining unit 214 if one piece of visual information corresponds to the caption subject information. If a plurality of pieces of visual information correspond to the caption subject information, the visual information suitable for a default condition is output to the combining unit 214. For example, if the corresponding visual information includes the stopped image and the avatar of the caption subject and the default condition is the stopped image, the visual information obtaining unit 217 outputs the stopped image of the caption subject to the combining unit 214.

When a selection control signal with respect to the displayed visual information is input from the system controller 219 in a state in which the plurality of pieces of visual information units are input into the visual information obtaining unit 217, the visual information obtaining unit 217 manages the output mode thereof so that the avatar of the caption subject can be output to the combining unit 214. The output mode of the visual information obtaining unit 217 can be applied to other caption subjects.

The user command input unit 218 can input commands requiring turning on/off of the visual information display of the user. Also, the user command input unit 218 can input a command requiring the visual information display position to move on the screen, that is, be placed in various positions on the display screen of the display unit 220.

When a signal turning on the visual information of the caption is input into the system controller 219 from the user command input unit 218, the system controller 219 provides to the combining unit 214 a signal that turns on the visual information combining function. Accordingly, the combining unit 214 combines the visual information output from the visual information obtaining unit 217 with the image signal and the caption signal and outputs the combined signal.

When a signal of turning off the visual information display is input from the user command input unit 218, the system controller 219 provides a signal that requires the visual information combining function to be turned off to the combining unit 214. Accordingly, the combining unit 214 ignores the visual information output from the visual information obtaining unit 217.

In addition, a signal that requires the visual information display position be moved to a discretionary position of the screen is input from the user command input unit 218, and the system controller 219 provides the combining unit 214 with the signal to request the display position change of the visual information and information on the changed position. Accordingly, the combining unit 214 combines the signals to change the displayed position of the visual information.

Figure 3A:
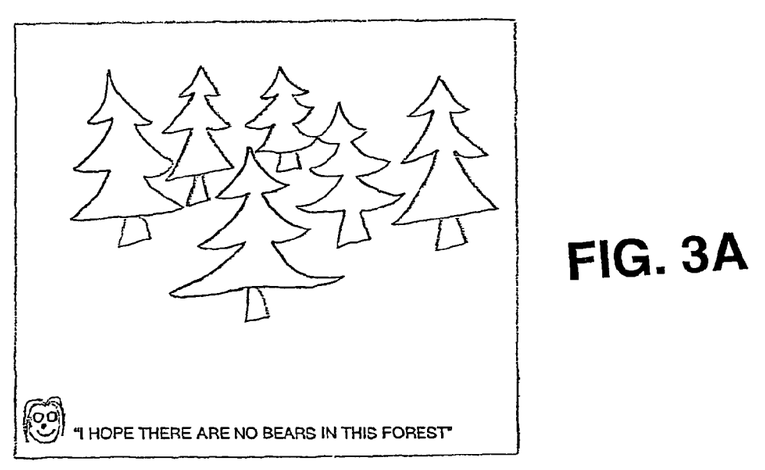
FIGS. 3A and 3B are exemplary views of caption presentations according to the embodiment of the present invention.
Figure 3B:
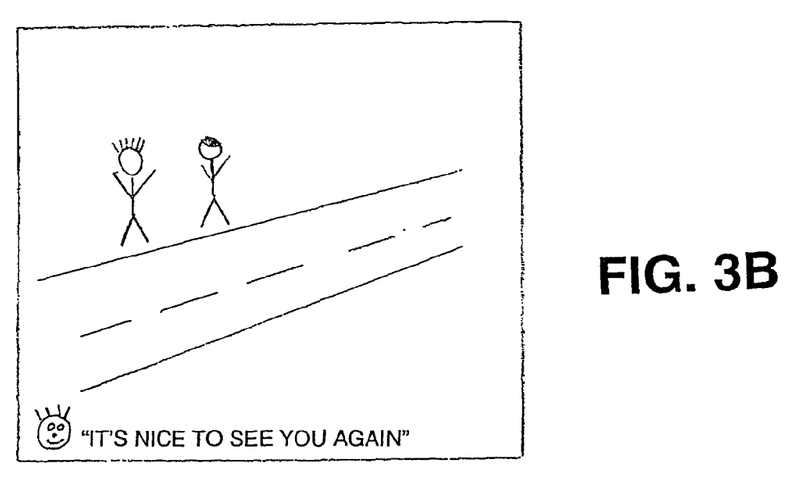

The display unit 220 displays the image signal provided by the combining unit 214. The image signal may be a signal that does not include the caption, a signal including the caption, or a signal including the caption and the visual information corresponding to the caption subject information. FIGS. 3A and 3B show a screen including a caption displayed on the display unit 220 and visual information on the caption. In FIGS. 3A and 3B, the visual information corresponding to the caption is provided as a thumbnail image FIG. 3A illustrates an image which does not include a visible speaker, and FIG. 3B illustrates an image with multiple possible visible speakers.

FIG. 2 illustrates an example of obtaining the visual information through an Internet search. However, in a case where the visual information is included in the received broadcast signal, the visual information obtaining unit 217 can detect the visual information corresponding to the caption in the received broadcast signal.

Figure 4:
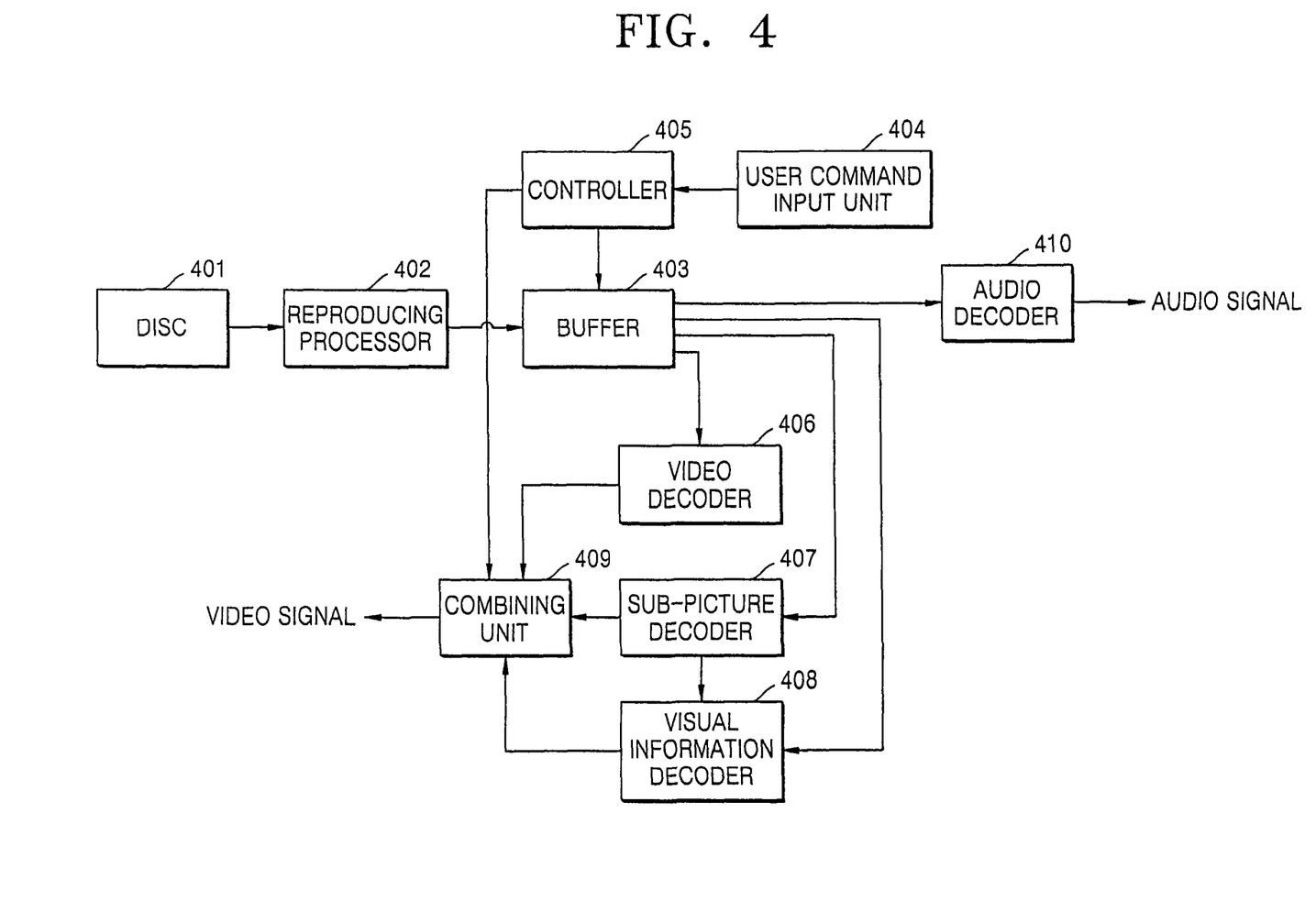
FIG. 4 is a block diagram of a disc driver including the caption presentation apparatus according to the embodiment of the present invention.

FIG. 4 is a block diagram showing a disc drive including the caption presentation apparatus according to the embodiment of the present invention. A disc drive is just one type of image reproducing image source which may be used to implement an embodiment of the present invention.

A disc 401 is a medium on which a video signal, a sub-picture signal, visual information corresponding to the sub-picture, and an audio signal can be recorded. For example, the sub-picture signal corresponds to the caption signal in FIG. 2. As described in FIG. 2, one or more pieces of visual information can correspond to the sub-picture signal. The visual information can be various representative images showing the subject of the sub-picture, as described in FIG. 2.

A reproducing processor 402 reproduces the video signal, the sub-picture signal, the visual information, and the audio signal reproduced from the disc 401.

A buffer 403 temporarily stores video frame data, sub-picture data, visual information, and audio data output from the reproducing processor 402 and outputs respectively video frame data, sub-picture data, visual information, and audio data controlled by a controller 405.

A video decoder 406 decodes the video frame data output from the buffer 403 and outputs the decoded data.

A sub-picture decoder 407 decodes the sub-picture data output from the buffer 403 and outputs the decoded data. Here, the sub-picture decoder 407 detects the subject information of the sub-picture data inserted in the sub-picture data and provides a visual information decoder 408 with the detected subject information. The subject information of the sub-picture data can be inserted into a section of the sub-picture data or into a predetermined section of the sub-picture data similar to the subject information of the caption described in FIG. 2.

The visual information decoder 408 stores the visual information provided by the buffer 403. When the subject information of the sub-picture data is transmitted from the sub-picture decoder 407, the visual information decoder 408 decodes the visual information corresponding to the subject information of the sub-picture data and outputs the decoded visual information. The visual information decoder 408 can store visual information with respect to a plurality of sub-pictures.

If there are a plurality of pieces of visual information corresponding to one sub-picture in the disc 401, the visual information decoder 408 decodes the visual information that is set as a default and outputs the decoded visual information. Although not shown in FIG. 4, when the signal for requesting change of visual information display is transmitted from the controller 405, the visual information decoder 408 decodes the visual information that is different from the presently displayed visual information among the plural pieces of visual information.

When the signal that requests that the visual information combining function be turned on is provided from the controller 405, a combining unit 409 combines the video signal transmitted from the video decoder 406, the sub-picture (or caption signal) transmitted from the sub-picture decoder 407, and the visual information transmitted from the visual information decoder 408 and outputs the combined signal.

However, when the signal that requests that the visual information combining function of the sub-picture be turned off is provided from the controller 405, the combining unit 409 ignores the visual information transmitted from the visual information decoder 408.

An audio decoder 410 decodes the audio data output from the buffer 403 and outputs the decoded data.

For example, the user command input unit 404 and the controller 405 respectively operate in substantially the same way as the user command input unit 218 and the system controller 219 of FIG. 2.

The disc drive of FIG. 4 shows a case in which the visual information corresponding to the sub-picture is recorded in the disc 401. However, the visual information corresponding to the sub-picture may also be obtained through an Internet search, as described in FIG. 2.

Figure 5:
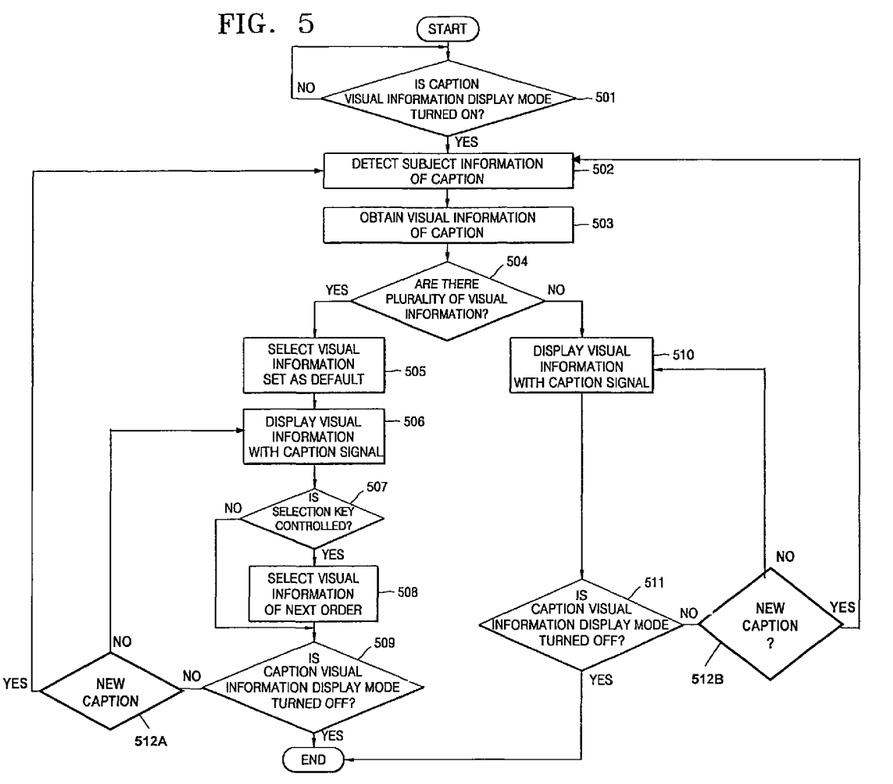
FIG. 5 is a flow chart illustrating a method of presenting captions according to the embodiment of the present invention.

FIG. 5 is a flow chart of the method of presenting the caption according to the embodiment of the present invention.

When the user requires the visual information display mode be turned on (operation 501), the caption subject information is detected from the input caption signal in operation 502. The subject information is detected in the way described with respect to the caption subject information detector 216 of FIG. 2. The caption signal may be included in the presently received broadcast signal or included in the presently reproduced image signal.

The visual information with respect to the caption is obtained based on the detected subject information of the caption in operation 503. The visual information is obtained in the way described with respect to FIGS. 2 and 4.

In operation 504, it is determined whether a plurality of pieces of visual information are obtained with respect to one caption.

If it is determined that a plurality of pieces of visual information are obtained with respect to one caption in operation 504, the visual information set as a default is selected among the plural pieces of visual information in operation 505. In operation 506, the caption signal and the selected visual information can be displayed together as shown in FIG. 3.

In operation 507, it is determined whether the selection key with respect to the displayed visual information is controlled by the user. If the selection key is not controlled by the user in operation 507, the presently displayed visual information is maintained. That is, if the presently displayed visual default information is the avatar of the caption, displaying of the avatar of the caption is maintained.

If the selection key for the visual information is controlled by the user in operation 507, the visual information of the next order is selected in operation 508. For example, if an avatar of the caption is the present default selection and the next selection is the stopped image of the caption, the stopped image is selected as the visual information of the caption in operation 508.

In operation 509, it is determined whether the user requires the visual information display mode be turned off. If it is determined that the user requires the visual information display mode of the caption be turned off in operation 509, the visual information display mode is terminated.

However, if it is determined that the user does not require the visual information display mode be turned off, the method proceeds to operation 512A. In operation 512A, it is determined whether a new caption has been input. If a new caption has been input, the method returns to operation 502. However, if no new caption has been input, the method returns to operation 506, and the visual information and the caption signal are displayed together. Here, the displayed visual information is the visual information selected in operation 508. Next, the same kind of visual information as that selected in operation 508 for other captions is displayed.

If one visual information unit corresponding to one caption is obtained in operation 504, the method goes to operation 510, and the visual information and the caption signal are displayed together as shown in FIG. 3.

In operation 511, it is determined whether the user requires the visual information display mode be turned off. If it is determined that the user requires the visual information display mode of the caption be turned off in operation 511, the visual information display mode is terminated. However, if it is determined that the user does not require the visual information display mode be turned off, the method proceeds to operation 512B, and the method proceeds in a manner similar to that described with respect to operation 512A.

As described above, according to the embodiment of the present invention, information on the subject of the caption can be displayed with the caption, and thus the subject of the caption can be clearly identified even in a scene where the speaker is not shown or a plurality of potential speakers are shown.

Also, information on the caption subject can be provided as various kinds of visual information, and the display position of the visual information can be moved according to the user selection.

Although an embodiment of the present invention has been shown and described, it would be appreciated by those skilled in the art that changes may be made in this embodiment without departing from the principles and spirit of the invention, the scope of which is defined in the claims and their equivalents.

What is claimed is:

1. A method comprising:
    receiving a multimedia signal including audio data, video data and auxiliary data;
    obtaining speech-text information from the auxiliary data;
    generating from the obtained speech-text information at least one text transcript;
    determining whether speaker identification data is available in the auxiliary data;
    identifying at least one speaker associated with the at least one text transcript according to the speaker identification data;
    receiving video identification data of the at least one identified speaker based on the speaker identification data;
    generating video identification of the at least one identified speaker based on the received video identification data;
    displaying a multimedia presentation comprising video data and audio data; and
    superimposing the video identification of the at least one identified speaker and a text transcript over the multimedia presentation in a scene where the speaker is not shown, the text transcript comprising text corresponding to each spoken word of the at least one identified speaker.

2. The method of claim 1, wherein the superimposing the text transcript further comprises displaying the spoken word in text form.

3. The method of claim 2, wherein at least one of the video identification and the text transcript can be superimposed if the identified speaker is not displayed in the multimedia presentation when playing back a spoken word of the identified speaker.

4. The method of claim 2, further comprising:
    displaying the video identification of the at least one identified speaker while concurrently displaying the at least one identified speaker, the video identification comprising an avatar image or a thumbnail image of the at least one identified speaker.

5. The method of claim 1, wherein the multimedia signal comprises a broadcast television signal, a cable television signal and a reproduced multimedia signal stored in a storage medium.

6. The method of claim 5, wherein the video identification data of the at least one identified speaker based on the speaker identification data can be searched and retrieved through an Internet by connecting to a server providing a video identification service.

7. The method of claim 5, wherein the video identification data of the at least one identified speaker based on the speaker identification data can be received through the multimedia signal.

8. The method of claim 5, wherein the video identification data of the at least one identified speaker based on the speaker identification data can be received from the storage medium.

9. The method of claim 4, wherein the avatar is positioned adjacent to a front of the text transcript.

10. The method of claim 2, wherein the displaying the text transcript comprises displaying the spoken word in text form without a reformatting process.

* * * * *